US008887299B2

United States Patent
Wang et al.

(10) Patent No.: US 8,887,299 B2
(45) Date of Patent: Nov. 11, 2014

(54) DIGITAL CONTENT RIGHTS MANAGEMENT METHOD AND SYSTEM

(75) Inventors: Yi Wang, Beijing (CN); Zhi Tang, Beijing (CN); Dengsha Yuan, Beijing (CN); Xuefeng Yang, Beijing (CN)

(73) Assignees: Peking University Founder Group Co., Ltd., Beijing (CN); Peking University, Beijing (CN); Beijing Founder Apabi Technology Ltd., Beijing (CN)

( * ) Notice: Subject to any disclaimer, the term of this patent is extended or adjusted under 35 U.S.C. 154(b) by 1414 days.

(21) Appl. No.: 12/522,989

(22) PCT Filed: Dec. 11, 2007

(86) PCT No.: PCT/CN2007/003528
§ 371 (c)(1),
(2), (4) Date: Dec. 8, 2009

(87) PCT Pub. No.: WO2008/089624
PCT Pub. Date: Jul. 31, 2008

(65) Prior Publication Data
US 2010/0086130 A1      Apr. 8, 2010

(30) Foreign Application Priority Data

Jan. 17, 2007   (CN) .......................... 2007 1 0062790

(51) Int. Cl.
*H04L 29/06*        (2006.01)
*G06F 21/10*        (2013.01)
*G06F 21/57*        (2013.01)

(52) U.S. Cl.
CPC ........ *G06F 21/10* (2013.01); *G06F 2221/2151* (2013.01); *G06F 21/57* (2013.01); *G06F 2221/2137* (2013.01)

USPC ............................................ 726/27

(58) Field of Classification Search
USPC .................... 713/175, 178; 726/27
See application file for complete search history.

(56) References Cited

U.S. PATENT DOCUMENTS

| | | | | |
|---|---|---|---|---|
| 6,233,341 | B1 * | 5/2001 | Riggins | 380/277 |
| 6,625,656 | B2 * | 9/2003 | Goldhor et al. | 709/231 |
| 6,920,567 | B1 * | 7/2005 | Doherty et al. | 726/22 |
| 6,970,849 | B1 * | 11/2005 | DeMello et al. | 705/52 |
| 7,533,266 | B2 * | 5/2009 | Bruekers et al. | 713/176 |
| 8,074,083 | B1 * | 12/2011 | Lee et al. | 713/194 |
| 2004/0039911 | A1 * | 2/2004 | Oka et al. | 713/175 |
| 2004/0064576 | A1 * | 4/2004 | Goldhor et al. | 709/232 |

(Continued)

FOREIGN PATENT DOCUMENTS

| | | |
|---|---|---|
| CN | 1642077 | 7/2005 |
| JP | 2003274339 A | 9/2003 |

*Primary Examiner* — Michael S McNally
(74) *Attorney, Agent, or Firm* — Finnegan, Henderson, Farabow, Garrett & Dunner, LLP

(57) ABSTRACT

A digital content rights management method and system belongs to the digital content rights management technique field. The method of the invention includes the steps: registering the system, generating the time stamp, verifying the time stamp when the system starts up, acquiring the certificate, verifying the time before accessing the digital content. The system of the invention comprises a device for accessing the digital content and a server, wherein the device for accessing the digital content comprises: a registering module, a time stamp generating module, a time stamp verification module, a certificate of authorization acquiring module, and a time verification module. The method and system have solved the problem that the digital content can still be used beyond the time limit.

20 Claims, 4 Drawing Sheets

(56) References Cited

U.S. PATENT DOCUMENTS

| | | | |
|---|---|---|---|
| 2005/0177513 A1* | 8/2005 | Kim | 705/51 |
| 2005/0223231 A1* | 10/2005 | Zhang et al. | 713/178 |
| 2006/0080260 A1* | 4/2006 | Chen et al. | 705/52 |
| 2008/0270308 A1* | 10/2008 | Peterka et al. | 705/51 |
| 2009/0304351 A1* | 12/2009 | Paila et al. | 386/95 |
| 2011/0238758 A1* | 9/2011 | Liang et al. | 709/204 |

* cited by examiner

DIGITAL CONTENT RIGHTS MANAGEMENT METHOD AND SYSTEM

FIELD OF THE INVENTION

The present invention relates to the digital content rights management technique field, and particularly relates to a digital content rights management method and a system.

BACKGROUND OF THE INVENTION

At present, with the popularization of network, digital contents such as electronic books, electro-newspaper, electric journals and digital video and audio have been accepted by more and more users, and the digital library is widely concerned in colleges, communities and even public networks. Thus, the copyright protection of digital content is becoming more and more important for publication houses, newspaper offices and libraries. The current problem is how to realize the copyright protection of digital content by time control in applications such as security protection of digital libraries and electronic documents. For instance, when a user "borrows" a digital content from the digital library, the digital library only allows the user to access the digital content within a particular time period. Therefore, the digital rights management system should correctly determine the "current time" when a user accesses the digital content: the user can access the digital content if the current time is within the designated time range; otherwise, the digital content is deemed as being expired, and the user cannot access said digital content.

The key to the realization of the digital content time control depends on the acquisition of a correct "current time" and avoidance of malicious amendments to the "current time". In order to realize the above purpose, the following solutions are usually adopted:

(1) The first solution realizes time control by combining the system time with a certain algorithm. Since the system time can be modified, and BIOS of the computer device can be cleared, it is unreasonable to determine whether the digital content are expired or not by means of the system time.

(2) The second solution realizes time control by modifying the certificate through writing the lapsed time into it. The disadvantage of this solution is as follows: if the user accesses the initial certificate to overwrite the modified certificate, the expired digital content can be used again.

(3) The third solution is recording the time difference when the user modifies the time. A DRM system performs correction according to the time difference (e.g. see the method of the patent application titled "Digital Rights Management Method And System For Content Copyright Protection" applied by Samsung Electronics Co., Ltd. in February, 2005). The disadvantage of this solution is that it is closely combined with the system hardware, for instance, it is hard to be realized a universal PC platform. Additionally, if the time of the device is not accurate, and the user performs correction according to a standard time, the system will consider it as a malicious time modification and record the time difference.

The above time control solutions all make it possible that the expired user employs a certain method (and it can be easily done) to access the expired digital content. If the expired digital content can still be used, the copyright protection of the digital content by means of time control cannot be realized.

Additionally, there are other solutions which record time by designing a special hardware device for achieving the purpose of time control. However, the method of designing a special hardware device is not suitable for a universal device, and it will increase the burden of common users and go against the popularization of digital contents. Therefore, universal devices such as PC require safe, convenient and practical time control methods.

SUMMARY OF THE INVENTION

One embodiment of the present invention provides a digital content rights management method comprising:

a registration step, in which a device for accessing the digital content registers in a digital content rights management system and generates a system register code and a random key;

a time stamp generating step of generating a time stamp as a guide for verifying the time;

a time stamp verification step, the validity of the time stamp is verified when the device for accessing the digital content starts up, if the verification passes, the next step is performed, and if the verification fails, the access of the digital content is not allowed;

a step of acquiring a certificate of authorization, in which the device for accessing the digital content acquires a certificate of authorization for accessing the digital content from a server, and the certificate of authorization specifies the starting time and the ending time of allowing to access the digital content;

a time verification step, in which the time stamp is verified with the time in the certificate of authorization to determine whether or not the device for accessing the digital content is allowed to access the digital content.

Furthermore, in said registration step, said register code is encrypted by using the random key.

Furthermore, in said time stamp generating step, said time stamp is written in a memory of the device for accessing the digital content. Said random key is positioned in said time stamp. Said time stamp further includes a version number of the device for accessing the digital content, starting time of the device for accessing the digital content, a verification code, and the latest time of acquiring the certificate of authorization.

Furthermore, the initial data is encrypted before writing said time stamp into the memory of the device for accessing the digital content.

Furthermore, in the time stamp verification step, the time stamp is verified when the device for accessing the digital content starts up, and a time stamp is reconstructed if there are no time stamps; the information in the time stamp is acquired before verifying the time if the time stamp exists, and if the verification passes, the starting time portion in the time stamp is updated by the current system time, and if the verification fails, the access of the digital content is not allowed.

Furthermore, a new random key is generated when the time stamp is reconstructed. Since the register code is encrypted by using said random key, the random key in the new time stamp will not correctly decode a register code data, thereby the time stamp cannot be arbitrarily deleted.

Furthermore, the version number and the verification code are verified when the information in the time stamp is required, thereby the validity of the time stamp is guaranteed.

Furthermore, the following steps are adopted when performing a time verification for the time stamp:

a. determining whether or not the current system time is earlier than the latest time for acquiring a certificate of authorization in the time stamp, and if the determination result is yes, the system time is determined as an error, otherwise, going to step b;

b. determining whether or not the current system time is earlier than the starting time in the time stamp, and if the determination result is yes, the system is determined as an error, and the starting time in the time stamp is updated by using a linear weighted average of both the times, otherwise, going to step c;

c. the method of verifying whether or not the latest time of acquiring the certificate of authorization in the time stamp is valid by means of following ways: randomly extracting starting time fields from a number of certificates of authorization, and if the latest time of acquiring the certificate of authorization in the time stamp is earlier than any starting time, it represents an error of the time stamp, otherwise, the time verification for the time stamp passes. Wherein suppose the current system time is T1, the weighted value is A, the starting time in the time stamp is T2, and the weighted value is B, then the linear weighted average is as follows: (A T1+B T2)/(A+B). The purpose of this is to avoid the situation that the user cannot read when the time is set back to a correct time after the time is set to be faster, and when using the average value, the starting time in the time stamp can rapidly recover to the correct time after starting the digital content rights management system for a limited number of times.

Furthermore, in the step of acquiring a certificate of authorization, the device for accessing the digital content writes the starting time field in the certificate of authorization into the time stamp after acquiring the certificate of authorization.

Furthermore, in the time verification step, the device for accessing the digital content verifies the time when accessing the digital content, firstly, the starting time in the time stamp is acquired, and if the current system time is earlier than the starting time, it is determined that the system time has been modified; then, the device for accessing the digital content acquires the latest time for acquiring the certificate of authorization in the time stamp, and if the current system time is earlier than this time, it is determined that the system time has been modified; finally, the device for accessing the digital content randomly extracts starting time fields from a number of certificates of authorization, and if the latest time for acquiring the certificate of authorization in the time stamp is earlier than any starting time, it represents an error of the time stamp.

Another embodiment of the present invention provides a digital content rights management system including a device for accessing the digital content and a server, and said device for accessing the digital content including:

a registering module by which the device for accessing the digital content performs system registration, and which generates system register code and random key;

a time stamp generating module for generating a time stamp, and said time stamp servers as a guide for time verification;

a time stamp verification module for verifying the validity of the time stamp when the device for accessing the digital content starts up, if the verification passes, the next step is performed, and if the verification fails, the access of the digital content is not allowed;

a certificate of authorization acquiring module for acquiring a certificate of authorization for accessing the digital content from the server; and a time verification module for verifying the time stamp with the time in the certificate of authorization to determine whether or not the device for accessing the digital content is allowed to access the digital content.

Furthermore, said device for accessing the digital content is a local device, and said server is a remote server.

Furthermore, said server includes a certificate server and a content server.

Furthermore, said device for accessing the digital content includes a common computer installed with reader software, a handset electronic equipment and a smart phone, and other equipments.

Furthermore, the device for accessing the digital content connects and communicates with the server through Internet.

The use of said method and system in the embodiments of the present invention effectively solves the problems that inaccurate reference time exists in the current digital content rights management solution of controlling digital content by time, and the user can still access the expired digital content by using a certain method.

DETAILED DESCRIPTION OF PREFERRED EMBODIMENTS

The embodiments of the present invention will be further explained below in detail with reference to the accompanying drawings. The present invention can be applied to a digital content rights management systems for electronic books, electro-newspaper, electric journals and digital video and audio and other digital contents. An embodiment of the present invention is further explained below by examples of electronic books in a digital library.

In a digital library, electronic books with the copyright protection can be lent to a reader. After the reader borrows an electronic book, the time period for reading said electronic book has been designated by a server in the digital library, and the time for reading the electronic book is controlled by the reading system of the electronic book.

After the reader submits a borrowing request, two files will be downloaded from the server of the digital library, one is a content file of the electronic book, and the other one is a certificate of authorization of the electronic book. The time period controlled by the time is set in the certificate of authorization, wherein the starting time is recorded in the StartTime field.

Figure 4:
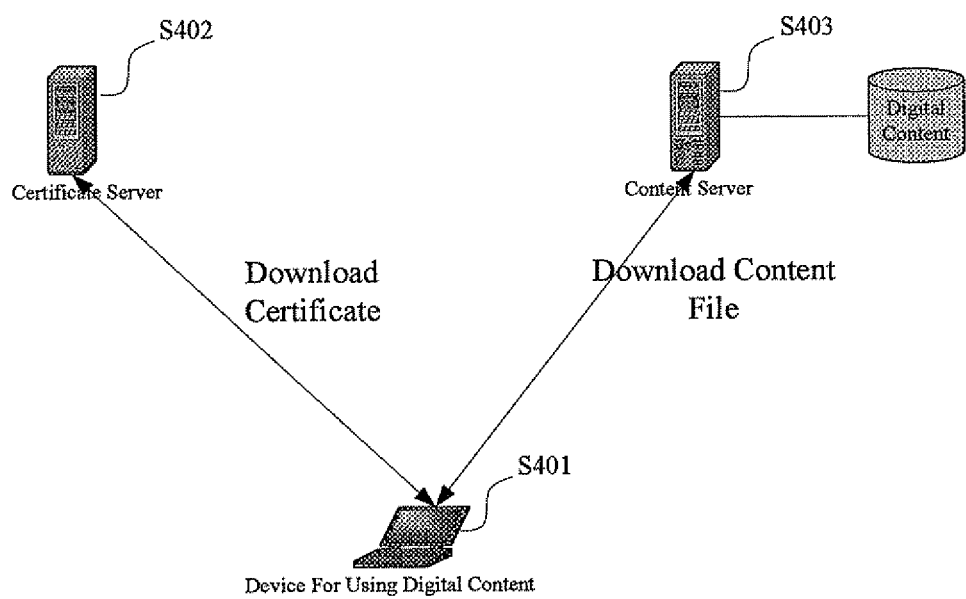
FIG. 4 is a structural diagram of the digital content rights management system according to the embodiments of the present invention.

FIG. 4 is a structural diagram of the digital content rights management system in the present invention. As shown in FIG. 4, the digital content rights management system in the present invention includes a local device for accessing the digital content S401 and a remote certificate server S402, and a content server S403. Said device for accessing the digital content S401 includes the following modules except for CPU, a memory and a display device:

a registering module by which the device for accessing the digital content S401 performs system registration, and which generates a system register code and a random key;

a time stamp generating module for generating a time stamp, and said time stamp serves as a guide for time verification;

a verification module for verifying the validity of the time stamp, which is used for verifying the validity of the time stamp when the digital content rights management system starts up, if the verification passes, the next step is performed, and if the verification fails, the access of the digital content is not allowed;

a module for acquiring a certificate of authorization for accessing the digital content from the certificate server; and a time validity verification module, which is used for verifying the validity of time before accessing digital content and which accesses the digital content after the verification passes.

Considering the safety of the system, the above certificate server S402 and content server S403 are preferably two independent servers.

The local device for accessing the digital content can be a common computer installed with reader software as well as other handset digital reading devices or smart phones installed with relevant reader software. The local device for accessing the digital content can connect and communicate with the remote certificate server and the content server by means of each cable or wireless manner. The implementing method is explained below in detail by taking the electronic books reader software under Windows operating system as an example.

Figure 1:
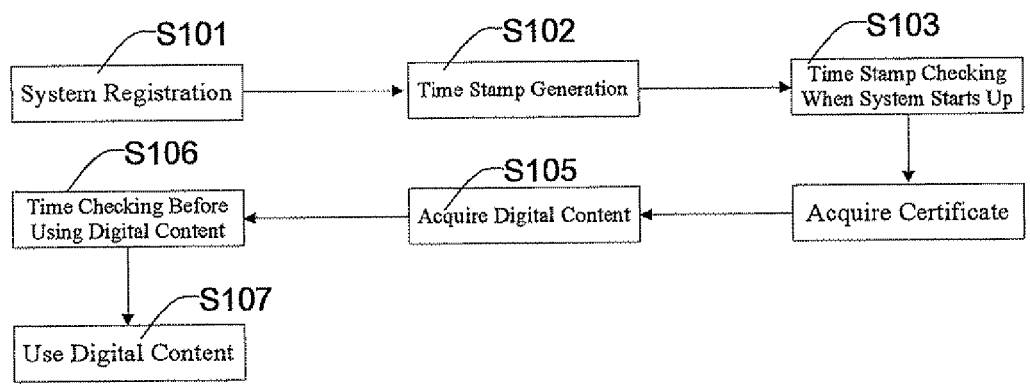
FIG. 1 is a principle diagram of the embodiments in the present invention.

FIG. 1 is a principle diagram of the embodiments in the present invention. As shown in FIG. 1, in the embodiment, the local device for accessing the digital content is a reader, which should register in the server system of the digital library in step S101 before borrowing the electronic books. a register code and a time stamp are generated in step S102 after the registration, and the register code is encrypted by using a random key which is positioned in the time stamp.

The register code and the time stamp are both written into a Windows registration table, and the time stamp includes the following information: a version number, the starting time of the reader, a random key, a verification code and the latest time for acquiring the certificate of authorization. The random key is used for encrypting the register code, and the verification code takes a constant. The initial data are encrypted before writing the time stamp into the registration table.

In verification step S103, the validity of the time stamp is verified when the device for accessing the digital content starts up. If the verification passes, the next step is performed, and if the verification fails, the access of the digital content is not allowed.

In step S104, the reader writes the starting time field in the certificate of authorization into the time stamp after downloading the certificate.

In step S105, the reader acquires the expected electronic book. The time verification is performed on the time in step S106 when the reader acquires the expected electronic book. Firstly, the reader acquires the starting time in the time stamp, if the current system time is earlier than the starting time, it is determined that the system time has been modified; then the reader acquires the latest time for acquiring the certificate in the time stamp, if the current system time is earlier than this time, it is determined that the system time has been modified; finally, the reader randomly extracts StartTime fields from a number of certificates, if the latest time for acquiring the certificate in the time stamp is earlier than any StartTime, it represents an error of the time stamp. The reader cannot open the electronic book for reading if any one of the conditions does not pass the verification. If the verification passes, the digital content can be used in step S107.

Figure 2:
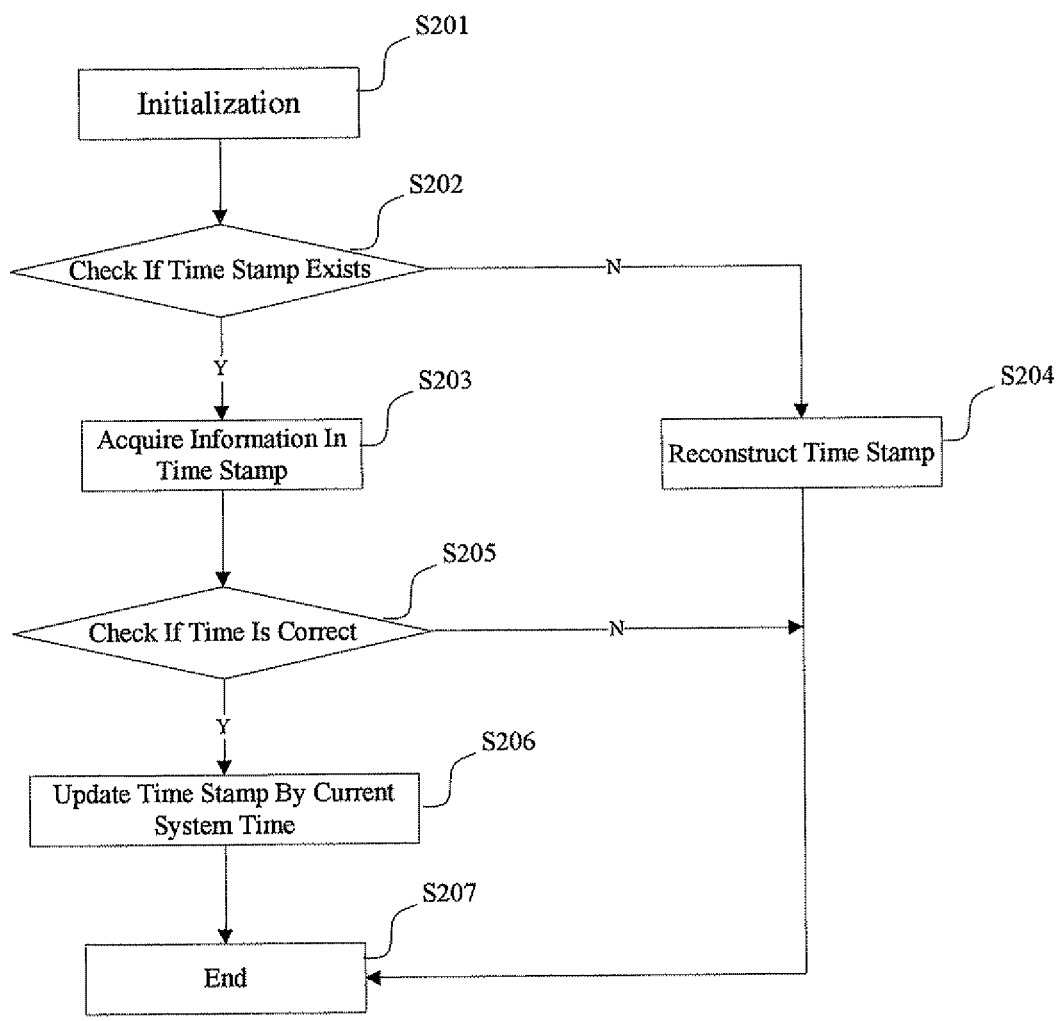
FIG. 2 is a flow chart of a time stamp verification module when the system according to the embodiments of the present invention starts.

The specific flow of the time stamp verification step S103 when the above system starts up is shown in FIG. 2. In step S201, the reader starts up and performs initialization. Then, the time stamp is verified in step S202, if the time stamp does not exist, a time stamp is reconstructed in step S204, and if the time stamp exists, the information of the time stamp is acquired in step S203. Then, a time verification is performed in step S205, if it is correct, the starting time portion in the time stamp is updated by using the current system time in step S206, and the time verification is finished in step S207, otherwise, a time stamp is reconstructed in step S204.

A new random key is generated when a time stamp is reconstructed in step S204. Since the register code is encrypted by using the random key, the random key in the new time stamp cannot correctly decode the register code data, thereby the time stamp cannot be randomly deleted.

The version number and the verification code are verified when information in the time stamp is acquired in step S203, thereby the validity of the time stamp is guaranteed.

Figure 3:
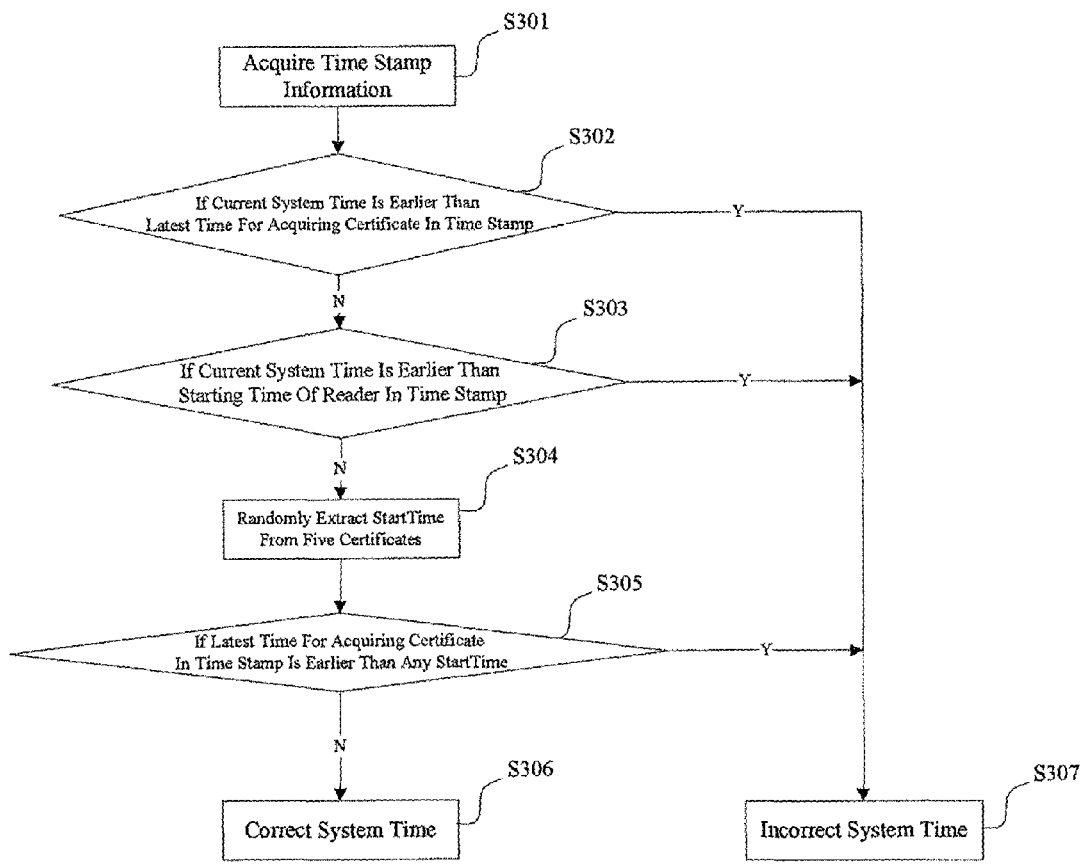
FIG. 3 is a flow chart for verifying the time of the time stamp according to the embodiments of the present invention.

FIG. 3 is a flow chart of performing a time verification for a time stamp in the embodiments of the present invention. As shown in FIG. 3, the method in step S301 for acquiring time stamp information and performing a time verification for a time stamp are as follows:

a. preferable step S302 determines whether or not the current system time is earlier than the latest time for acquiring the certificate in the time stamp, and if the determination result is yes, the step S307 determines an error of the system time, otherwise, going to step b;

b. step S303 determines whether or not the current system time is earlier than the time when the reader starts in the time stamp, and if the determination result is yes, step S307 determines an error of the system time and updates the starting time in the time stamp by using the average value of two times, otherwise, going to step c;

c. step S304 verifies whether the latest time for acquiring the certificate in the time stamp is valid or not. The verification method is randomly extracting StartTime fields from five certificates, and if the latest time for acquiring the certificate in the time stamp is earlier than any StartTime, as shown in step S305, it represents an error of the time stamp, otherwise, the step S306 can determine that the system time is correct.

Several special situations in the present invention are further described below with reference to the accompanying drawings. The flows of other situations are shown in the summary of the invention.

The first situation: when the reader starts, a time stamp is generated and written into the registration table of the Windows system if there are no time stamps, otherwise, it is determined whether or not the time stamp is valid, an error mark of the time stamp is recorded if it is invalid, and the starting time in the time stamp us updated if it is valid.

The second situation: the system time is modified. For instance, if a user borrows a book with three day validity on Jul. 7, 2006, and the user intends to read this book on Jul. 11, 2006 and sets the system time to Jul. 8, 2006, then the system time is determined as an error if the user started the reader or borrowed other books after Jul. 8, 2006. If a user wants to read an expired book, he or she must guarantee, when this book expires, that the reader is never started or no book is borrowed before the system time is modified.

The third situation: the user directly deletes the time stamp. Since the time stamp includes the encryption key of the system registration information in the digital library, and a new random key is used for constructing a new time stamp after the deletion, the key acquired from the time stamp will not decode the registration information, thereby the electronic book which has been borrowed cannot be read.

The fourth situation: the user backups the time stamp in other positions after borrowing the book and covers the current time stamp after the book is expired. At that time, the time stamp verification has no problem, however, the reader compares the current system time with the due date in the certificate for determining that the expired book cannot be read.

The fifth situation: the user backups the time stamp in other positions after borrowing the book, covers the current time stamp after the book is expired and sets the system time within the period of validity. Since the system randomly extracts StartTime fields from five certificates of books which have been borrowed for verification, once it is discovered that the latest time for acquiring the certificate in the time stamp is earlier than any StartTime, an error of the time stamp is determined, and the electronic book which has been borrowed cannot be read.

The methods stated in the present invention are not limited to the embodiments in the specific implementing manners. A person skilled in the art may obtain other implementing manners which are also within the scope of technical innovation of the present invention according to the technical solutions of the present invention.

The invention claimed is:

1. A digital content rights management method comprising:
    generating a time stamp, by a device including a program for accessing a digital content, wherein the time stamp includes time information of the device;
    when the program for accessing the digital content starts up, verifying validity of the time stamp, wherein if the verification passes, performing a next step and if the verification fails, disallowing the access of the digital content;
    acquiring a certificate of authorization for accessing the digital content, wherein the certificate of authorization specifies a starting time and an ending time of allowing to access the digital content; and
    verifying a time of the device with the time stamp and the certificate of authorization to determine whether the device is allowed to access the digital content.

2. The digital content rights management method in claim 1 further comprising:
    registering the device in a digital content rights management system and obtaining a system register code and a random key, wherein said system register code is encrypted by using the random key.

3. The digital content rights management method in claim 2, wherein said time stamp includes a version number of the program, a starting time of the program, a verification code, and a latest time of acquiring the certificate of authorization.

4. The digital content rights management method in claim 3, further comprising verifying the version number and the verification code.

5. The digital content rights management method in claim 1, wherein the time information of the device includes a starting time of the program on the device.

6. The digital content rights management method in claim 1, wherein if the time stamp does not exist, reconstructing a time stamp; if the time stamp exists, updating the starting time in the time stamp with a current system time of the device.

7. The digital content rights management method in claim 6, further including generating a new random key when the time stamp is reconstructed.

8. The digital content rights management method in claim 1, wherein the verifying a time of the device with the time stamp and the certificate of authorization comprising:
    a. determining whether a current system time of the device is earlier than the latest time for acquiring a certificate of authorization in the time stamp, and if the determination result is yes, determining the current system time as an error, otherwise, going to step b;
    b. determining whether the current system time is earlier than a starting time in the time stamp, and if the determination result is yes, determining the current system time as an error, otherwise, going to step c; and
    c. verifying whether the latest time of acquiring the certificate of authorization in the time stamp is valid by: randomly extracting starting time fields from a number of certificates of authorization, and if the latest time of acquiring the certificate of authorization in the time stamp is earlier than any starting time, determining that there is an error of the time stamp.

9. The digital content rights management method in claim 1 further comprising writing the starting time in the certificate of authorization into the time stamp after acquiring the certificate of authorization.

10. The digital content rights management method in claim 1, wherein verifying validity of the time stamp includes determining whether a current system time of the device is earlier than a starting time of the program, and if it is yes, determining that the system time has been modified; determining whether the current system time is earlier than a latest time for acquiring the certificate of authorization in the time stamp, and it is yes, determining that the system time has been modified; extracting starting time fields from a number of certificates of authorization, and if a latest time for acquiring the certificate of authorization in the time stamp is earlier than any starting time, determining that there is an error of the time stamp.

11. A digital content rights management device comprising:
    a processor configured to:
        obtain, by a program executed by the processor, a digital content;
        generate a time stamp associated with the digital content, the time stamp including time information of the device;
        compare a current system time of the device with the time information of the device in the time stamp to determine whether the device is allowed to access the digital content,
        wherein the time stamp further includes at least one of the following: a version number of the program, a verification code, or a latest time of acquiring the certificate of authorization.

12. The digital content rights management device of claim 11, wherein the processor is further configured to obtain a certificate of authorization, which specifies a starting time and an ending time of allowing to access the digital content.

13. The digital content rights management device of claim 12, wherein the time stamp includes a latest time for acquiring the certificate of authorization, and wherein the processor is further configured to:
    extract starting times from a number of certificates of authorization, and if the latest time of acquiring the certificate of authorization in the time stamp is earlier than any of the extracted starting times, determine that there is an error of the time stamp.

14. The digital content rights management device of claim 12, wherein the time stamp includes a latest time for acquiring the certificate of authorization and wherein the processor is further configured to determine whether the current system time of the device is earlier than the latest time for acquiring a certificate of authorization in the time stamp, and if the determination result is yes, determine the current system time as an error and disallow the access of the digital content.

15. The digital content rights management device of claim 11, wherein the time information of the device includes a starting time of the program on the device.

16. The digital content rights management device of claim 15, wherein the processor is further configured to determine whether the current system time is earlier than the starting time in the time stamp, and if the determination result is yes, determine the current system time as an error.

17. The digital content rights management device of claim 11, wherein the processor is further configured to verify, when the program starts to access a digital content, whether a time stamp associated with the digital content exists, and
if the time stamp does not exists, disallow the access of the digital content.

18. A digital content rights management method comprising:
obtaining, by a program executed by a processor on a device, a digital content;
generating a time stamp associated with the digital content, the time stamp including time information of the device; and
comparing a current system time of the device with the time information of the device in the time stamp to determine whether the device is allowed to access the digital content,
wherein the time stamp further includes at least one of the following: a version number of the program, a verification code, or a latest time of acquiring the certificate of authorization.

19. The digital content rights management method of claim 18 further comprising obtaining a certificate of authorization, which specifies a starting time and an ending time of allowing to access the digital content.

20. The digital content rights management method of claim 18, wherein the time information of the device includes a starting time of the program on the device, and the comparing a current system time of the device with the time information of the device comprises comparing the current system time with the starting time of the program, and determining whether the current system time is earlier than the starting time of the program, and if the determination result is yes, determining the current system time as an error.

* * * * *